(12) United States Patent
Liu et al.

(10) Patent No.: US 11,011,931 B2
(45) Date of Patent: May 18, 2021

(54) CROSS-CHARGING AMONG IOT DEVICES WITH PRIORITIZING MANAGEMENT RULES

(71) Applicant: International Business Machines Corporation, Armonk, NY (US)

(72) Inventors: Kai Liu, Malden, MA (US); Su Liu, Austin, TX (US); Manjunath Ravi, Austin, TX (US); Zhichao Li, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 16/225,257

(22) Filed: Dec. 19, 2018

(65) Prior Publication Data
US 2020/0203982 A1    Jun. 25, 2020

(51) Int. Cl.
| | | |
|---|---|---|
| *H02J 50/10* | (2016.01) | |
| *H02J 7/04* | (2006.01) | |
| *G06F 16/901* | (2019.01) | |
| *H04L 29/08* | (2006.01) | |
| *H02J 7/00* | (2006.01) | |
| *H02J 50/80* | (2016.01) | |

(52) U.S. Cl.
CPC ............ *H02J 50/10* (2016.02); *G06F 16/901* (2019.01); *H02J 7/0013* (2013.01); *H02J 7/00041* (2020.01); *H02J 7/042* (2013.01); *H02J 50/80* (2016.02); *H04L 67/12* (2013.01); *H04L 67/306* (2013.01); *H02J 7/00034* (2020.01)

(58) Field of Classification Search
CPC .................................. H02J 50/80; H02J 50/10
USPC .......................................................... 320/108
See application file for complete search history.

(56) References Cited

U.S. PATENT DOCUMENTS

| | | | |
|---|---|---|---|
| 9,614,396 | B1 | 4/2017 | Bait-Suwailam et al. |
| 2009/0023480 | A1 | 1/2009 | Nandi et al. |
| 2011/0016333 | A1 | 1/2011 | Scott et al. |
| 2013/0043738 | A1 | 2/2013 | Park et al. |
| 2013/0162201 | A1 | 6/2013 | Yeh |
| 2014/0091623 | A1* | 4/2014 | Shippy .................... H02J 7/342 307/31 |
| 2016/0126779 | A1 | 5/2016 | Park |
| 2016/0359376 | A1* | 12/2016 | Zeine .................... G01R 31/40 |

FOREIGN PATENT DOCUMENTS

WO    WO-2011/112022 A2    9/2011

* cited by examiner

*Primary Examiner* — Eric D Lee
(74) *Attorney, Agent, or Firm* — Teddi Maranzano

(57) ABSTRACT

Cross-charging among a set of wireless charging IoT devices using prioritizing management rules is disclosed. Device battery status data is received from each wireless charging device in the set of wireless charging devices. A device usage pattern is generated based on user profile data for each wireless charging device in the set of wireless charging devices. At least one priority management rule (PMR) is assigned to at least one wireless charging device in the set of wireless charging devices based on the device battery status data and user profile data from each wireless charging device in the set of wireless charging devices. At least one cross-charging instruction is transmitted to at least one wireless charging device in the set of wireless charging devices based on the at least one PMR.

20 Claims, 11 Drawing Sheets

CROSS-CHARGING AMONG IOT DEVICES WITH PRIORITIZING MANAGEMENT RULES

BACKGROUND

Field of the Invention

The field of the invention is data processing, or, more specifically, methods, apparatus, and products for cross-charging among internet of things (IoT) devices with prioritizing management rules.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The internet of things (IoT) is conceptually a network of physical objects embedded with electronics, sensors, software and connectivity to enable the exchange of data with other connected devices over a data communication infrastructure according to a standard or specification. IoT devices include among other things a variety of mobile devices—including smartphones and other mobile communication devices, as well as many other devices in everyday use—that can communicate and interoperate with each other using such an infrastructure. IoT devices may communicate with each other through internet, ad-hoc, or other network connections without the need for human user interaction.

People carry multiple electronic devices capable of IoT communication every day. Common devices include phones, tablets, laptops, headphones, and smart watches. The battery consumption of such devices varies daily and individually. For instance, consider the scenario when a user depletes the battery of phone and has to miss important calls, while carrying a tablet and a laptop still with full power.

Wireless charging, also known as inductive charging or cordless charging, allows a device to charge its battery wirelessly from a power source. In a wireless cross-charging environment, mobile user devices such a laptops, tablets, phones, and the like may charge each other wirelessly, that is, without the need for charging cables or other non-wireless connection. For example, a person may use a laptop to charge phone, or use a tablet to charge watch.

However, with the advent of wireless cross-charging devices, there is a need to create individual customized charging management rules that automatically initiate charging events based on a user's needs and prioritization.

SUMMARY

One embodiment of the present invention is directed to a method of cross-charging among IoT devices with prioritizing management rules, the IoT devices including a set of wireless charging devices corresponding to a user, the method comprising receiving device battery status data from each wireless charging device in the set of charging devices, generating a device usage pattern based on user profile data for each wireless charging device in the set of wireless charging devices, assigning at least one priority management rule (PMR) to at least one wireless charging device in the set of wireless charging devices based on the device battery status data and user profile data from each wireless charging device in the set of wireless charging devices, and transmitting at least one cross-charging instruction to at least one wireless charging device in the set of wireless charging devices based on the at least one PMR.

Another embodiment of the present invention is directed to an apparatus for cross-charging among IoT devices with prioritizing management rules, the IoT devices including a set of wireless charging devices corresponding to a user, the apparatus comprising a computer processor, a computer memory operatively coupled to the computer processor, the computer memory having disposed within it computer program instructions that, when executed by the computer processor, cause the apparatus to carry out the steps of receiving device battery status data from each wireless charging device in the set of charging devices, generating a device usage pattern based on user profile data for each wireless charging device in the set of wireless charging devices, assigning at least one priority management rule (PMR) to at least one wireless charging device in the set of wireless charging devices based on the device battery status data and user profile data from each wireless charging device in the set of wireless charging devices, and transmitting at least one cross-charging instruction to at least one wireless charging device in the set of wireless charging devices based on the at least one PMR.

Yet another embodiment of the present invention is directed to a computer program product for cross-charging among IoT devices with prioritizing management rules, the computer program product disposed upon a computer readable medium, the computer program product comprising computer program instructions that, when executed, cause a computer to carry out the steps of receiving device battery status data from each wireless charging device in the set of charging devices, generating a device usage pattern based on user profile data for each wireless charging device in the set of wireless charging devices, assigning at least one priority management rule (PMR) to at least one wireless charging device in the set of wireless charging devices based on the device battery status data and user profile data from each wireless charging device in the set of wireless charging devices, and transmitting at least one cross-charging instruction to at least one wireless charging device in the set of wireless charging devices based on the at least one PMR.

In some embodiments of the present invention, receiving device battery status data from each wireless charging device in the set of charging devices comprises creating a device battery metric (DBM) record for each wireless charging device in the set of wireless charging devices based on the device battery status data, and storing the DBM data structure in an encrypted database.

In some embodiments of the present invention, generating a device usage pattern based on user profile data for each wireless charging device in the set of wireless charging devices further comprises generating a usage history for each wireless charging device in the set of wireless charging devices, and predicting the device usage pattern based at least on device usage history for each wireless charging device in the set of wireless charging devices.

In some embodiments of the present invention, assigning at least one priority management rule (PMR) to at least one wireless charging device in the set of wireless charging devices based on the device battery status data and user profile data from each wireless charging device in the set of wireless charging devices further comprises defining charging priority management rules based on at least a predicted power usage of each device of the set of wireless charging devices and a remaining power capacity of each device of the set of wireless charging devices.

In some embodiments of the present invention, transmitting at least one cross-charging instruction to at least one wireless charging device in the set of wireless charging devices to each wireless charging device of the plurality of wireless charging devices based on the at least one PMR further includes initiating wireless charging between a first wireless charging device and a second wireless charging device of the set of wireless charging devices based on the at least one PMR.

Some embodiments of the present invention may further comprise receiving an instruction from a user that modifies the at least one PMR in a first wireless charging device in the set of wireless charging devices, and updating at least one PMR corresponding to a second wireless charging device in the set of wireless charging devices in accordance with the received user instruction.

Some embodiments of the present invention may further comprise calculating a wireless charging power transfer loss between at least two wireless charging devices in the set of wireless charging devices.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Embodiments of the present invention are directed to cross-charging systems, apparatuses, computer programs, and methods for creating a cooperative environment for wireless charging among capable IoT Devices based on Prioritizing Management Rules (PMR). Upon detecting and analyzing individual usage patterns for devices, PMRs may be applied to reduce usage interruption by achieving battery balancing and prioritization per device.

Figure 1:
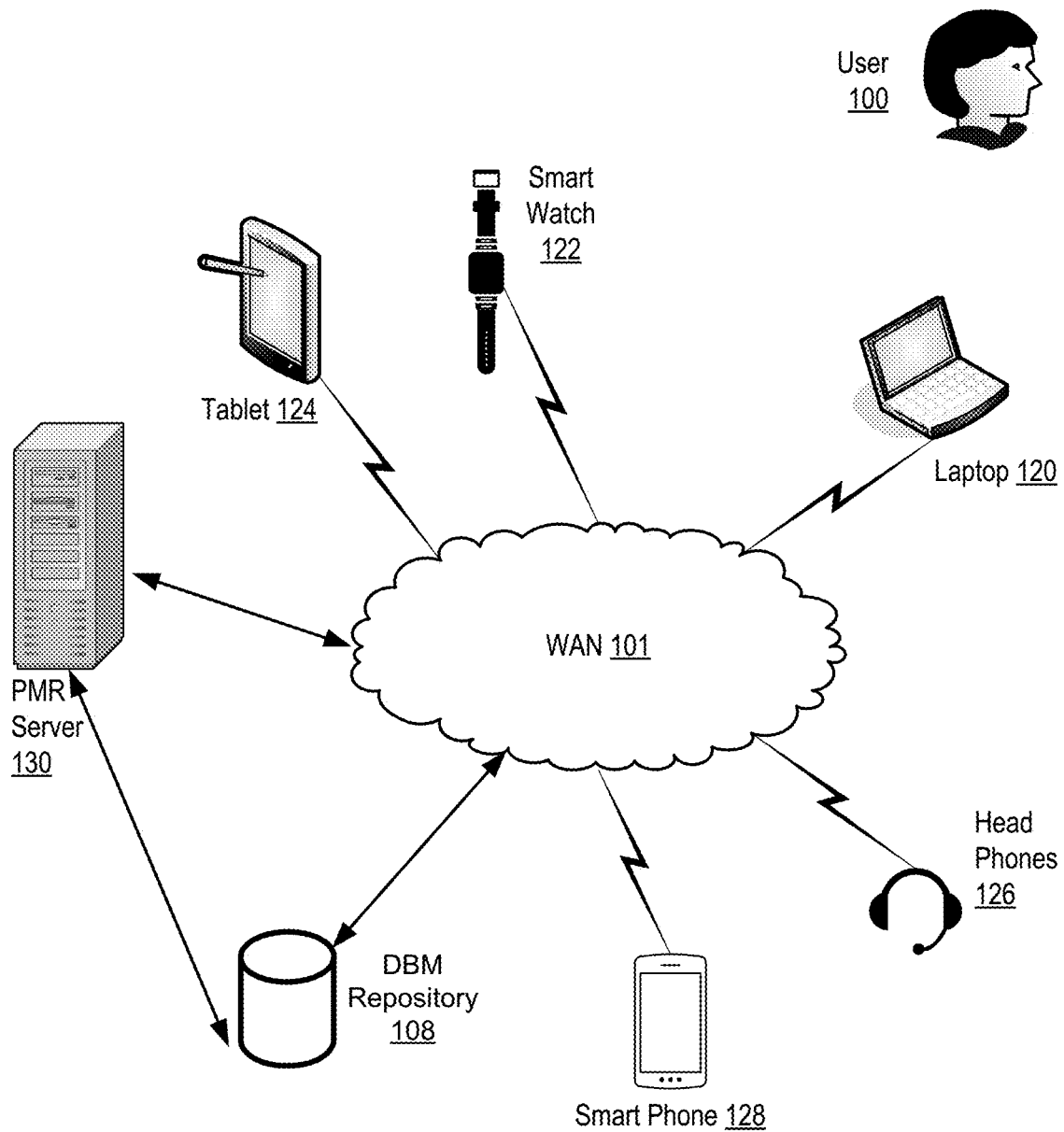
FIG. 1 illustrates a network diagram of a system for cross-charging among IoT devices with prioritizing management rules according to embodiments of the present invention.

Exemplary methods, apparatus, and products for cross-charging among internet of things (IoT) devices with prioritizing management rules in accordance with the present invention are described with reference to the accompanying drawings, beginning with FIG. 1. FIG. 1 sets forth a network diagram of a system for cross-charging among IoT devices with prioritizing management rules according to embodiments of the present invention. The system of FIG. 1 includes a set of wireless charging IoT devices, such as a tablet (124), a smart watch (122), a laptop (120), a smart phone (128), and/or headphones (126), that belong to a particular user (100). That is, cross-charging wireless charging devices may charge each other through wireless charging mechanisms, which may be known to one of ordinary skill in the art. Further, the wireless charging IoT devices may communicate via wide area network (101), with or without human intervention, with a PMR server (130) that manages the cross-charging of the IoT devices using PMRs. Device battery metric (DBM) data provided to the PMR server (130) by the individual IoT devices may be stored in a repository (108). The IoT network diagram depicted in FIG. 1 may be implemented by a wide area network (101).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Cross-charging among IoT devices with prioritizing management rules in accordance with the present invention is generally implemented with computers, that is, with automated computing machinery. In the system of FIG. 1, for example, all the wireless charging IoT devices are implemented to some extent at least as computers. For further explanation, therefore, FIG. 2 sets forth a block diagram of a prioritizing management rules (PMR) system (201) of automated computing machinery comprising an exemplary computer (152) for cross-charging among IoT devices with prioritizing management rules according to embodiments of the present invention. The computer (152) of FIG. 2, which may comprise the PMR server (130), includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a priority rules management engine (408), a module of computer program instructions improved for cross-charging among IoT devices with prioritizing management rules according to embodiments of the present invention.

Also stored in RAM (168) is an operating system (154). Operating systems useful in computers for cross-charging among IoT devices with prioritizing management rules according to embodiments of the present invention include UNIX™, Linux™, Microsoft XP™, AIX™, IBM's i5/OS™, and others as will occur to those of skill in the art. The operating system (154) and PMR engine 408 in the example of FIG. 2 are shown in RAM (168), but many components of such software typically are stored in non-volatile memory also, such as, for example, on a disk drive (170).

Figure 2:
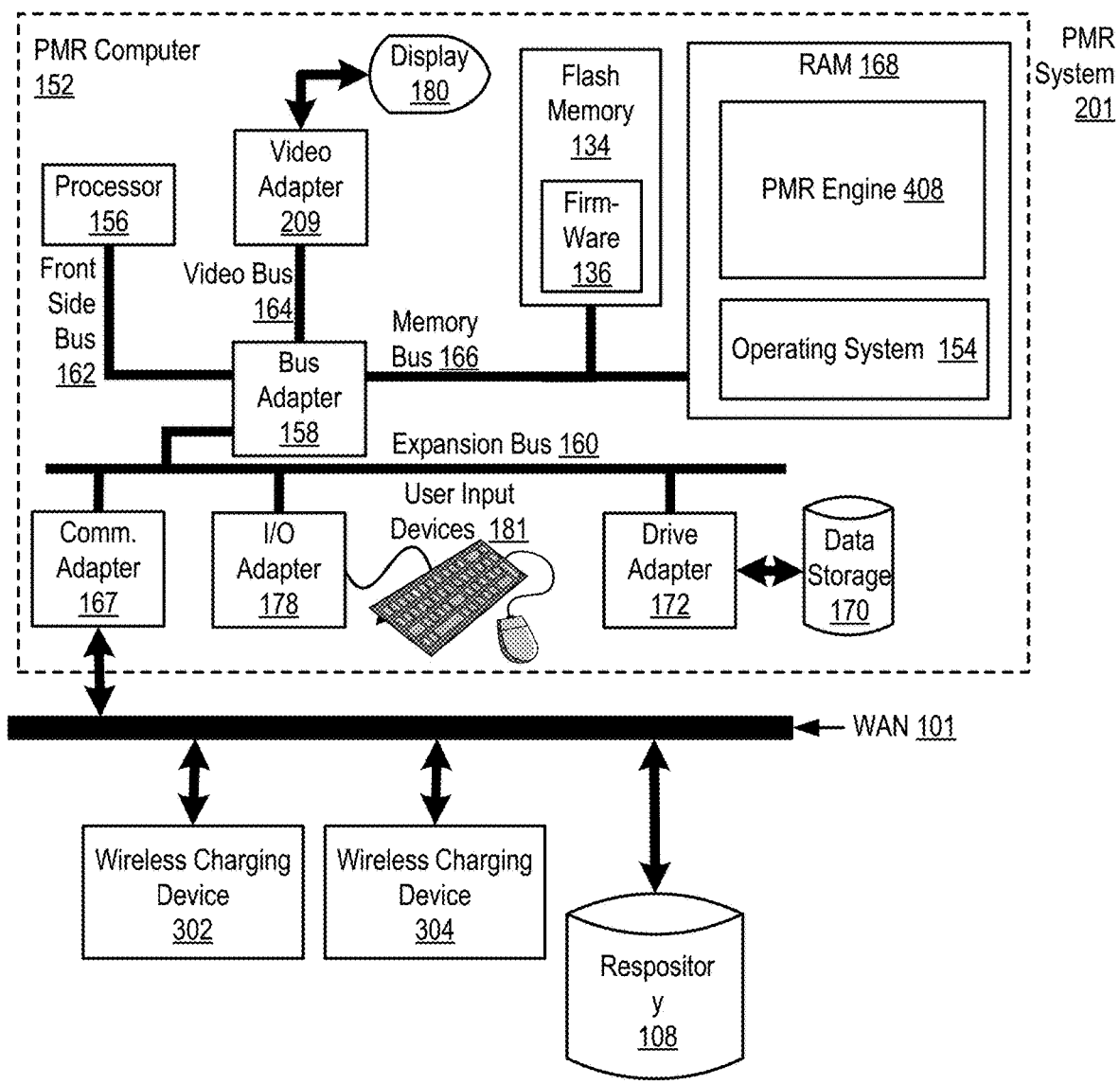
FIG. 2 illustrates a block diagram of an exemplary computer cross-charging prioritizing management rules system according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for cross-charging among IoT devices with prioritizing management rules according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory) (134), firmware (136), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers for cross-charging among IoT devices with prioritizing management rules according to embodiments of the present invention include modems for wired dial-up communications, Ethernet (IEEE 802.3) adapters for wired data communications, and 802.11 adapters for wireless data communications.

The exemplary computer (152) is connected, via the communications network 101, to wireless charging devices (302, 304). The communications network 101 may further connect the exemplary computer to a remote repository (108) that store PMRs for managing the wireless charging devices (302, 304).

Figure 3:
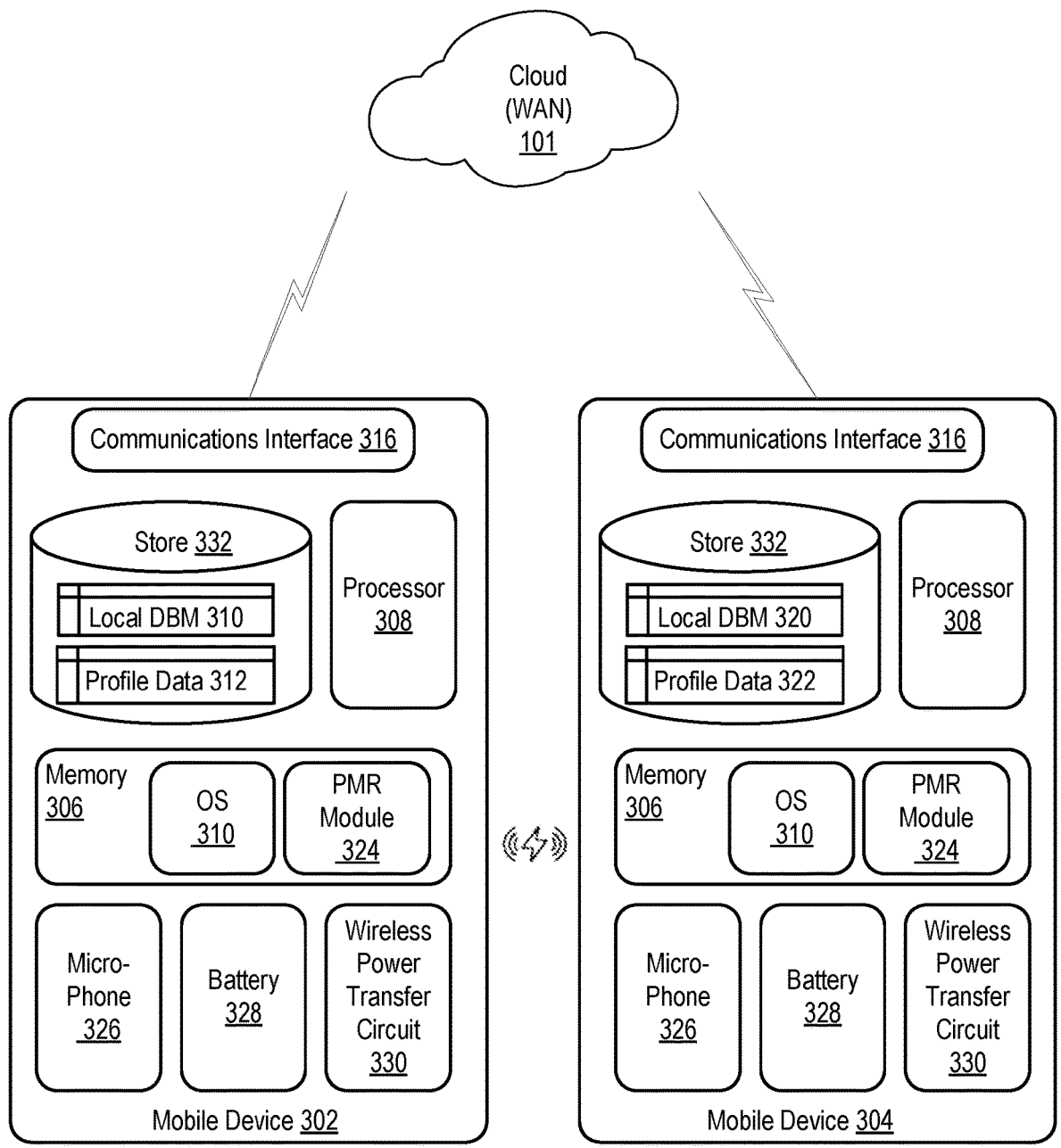
FIG. 3 sets forth a diagram illustrating exemplary wireless charging devices for a system for cross-charging among IoT devices with prioritizing management rules according to embodiments of the present invention.

For further explanation, FIG. 3 sets forth a diagram illustrating wireless charging devices in a system for cross-charging among IoT devices with prioritizing management rules according to embodiments of the present invention. The diagram in FIG. 3 includes example wireless charging devices (302) and (304). The wireless charging devices (302, 304) include a processor (308), a memory (306) that may include an operating system (OS) (310) and a priority management rule (PMR) module (324), a microphone (326), a battery (328), a communications interface (316), and a storage device (332). The storage device (332) in wireless charging device (302) may store a local DBM record (310) and a device profile data (312). The storage device (332) in wireless charging device (304) may store a local DBM record (320) and a device profile data (322). The wireless charging devices (302, 304) further include a wireless power transfer circuit (330), which may an inductive charging or cordless charging circuit for charging the battery (328). The PMR module (324) receives priority factored DBMs (432) from the PMR engine (408) and applies the rules to the device charging and power configuration.

Figure 4:
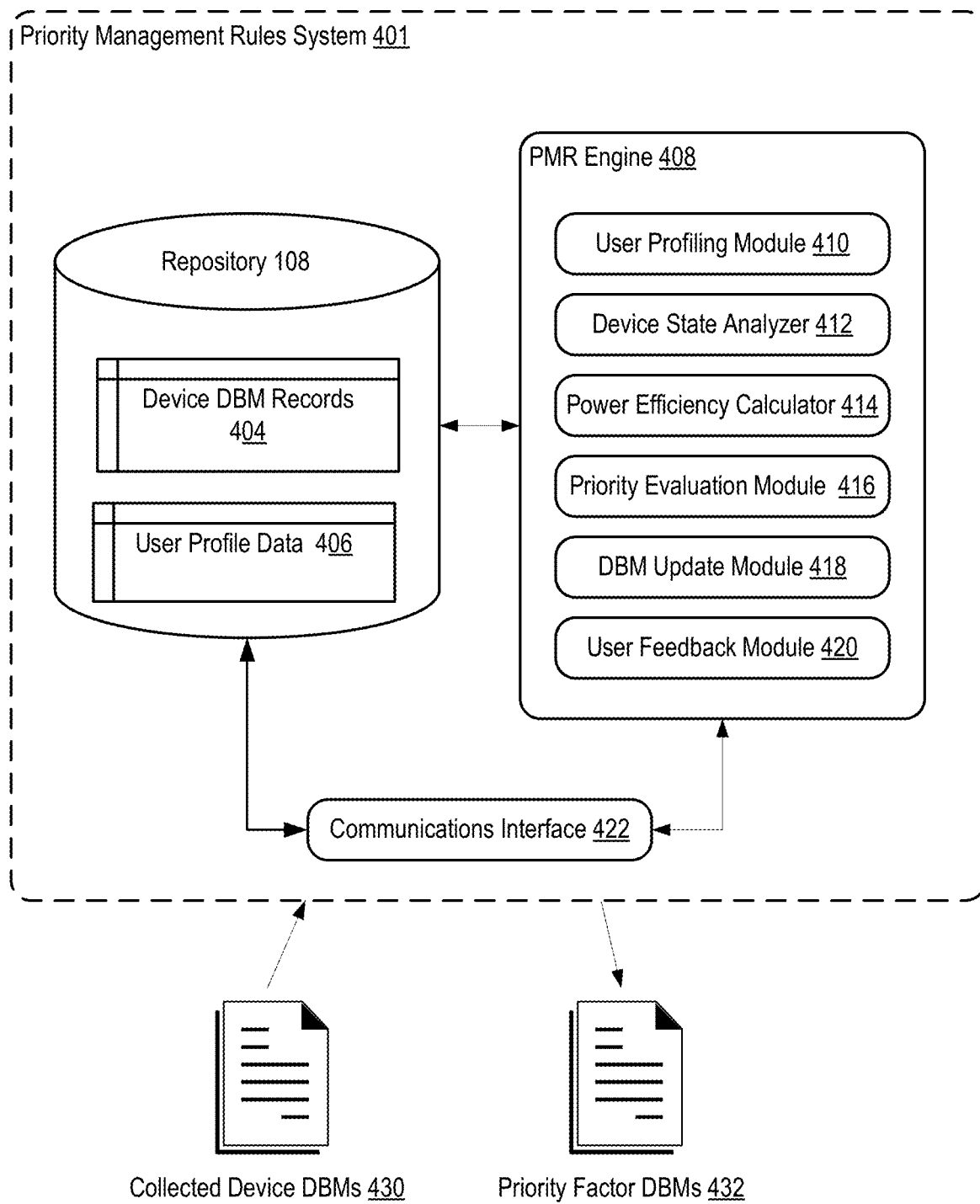
FIG. 4 sets forth a diagram illustrating an exemplary system for cross-charging among IoT devices with prioritizing management rules according to embodiments of the present invention FIG. 5 sets forth a flow chart illustrating an example method for cross-charging among IoT devices with prioritizing management rules according to embodiments of the present invention.

For further explanation, FIG. 4 sets forth a diagram illustrating an exemplary system for cross-charging among IoT devices with prioritizing management rules according to embodiments of the present invention. The system diagram in FIG. 4 includes a priority management rules (PMR) system (401) that includes a PMR engine (408) and the repository (108). The repository (108) may local to the PMR engine (408) or implemented as remote storage. Further the repository (108) may be a centralized or distributed memory system.

The PMR engine (408) may include various modules, including a device state analyzer module (412), a user profiling module (410), a power efficiency calculator (414), a priority evaluation module (416), a device battery metric (DBM) update module (418), and a user feedback module (420), as well as a communications interface (422). The PMR engine receives DBM records (430) from the set of wireless charging devices belonging to the user. The PMR engine (408) and its components may be embodied, for example, as a module of computer program instructions executing on computer hardware such as a computer processor. The PMR engine (408) may be included as part of a standalone computer, including software and hardware components, one or more computer processors, and computer memory, that provides system management functions for all components in the example computing system (152). Such a computer may also make available connections to the cloud (101).

The device state analyzer module (412) receives user device battery status data from each wireless charging device of a plurality of charging devices corresponding to a user in the cross-charging system. The device state analyzer module (412) may also define a DBM data structure for each device, and store the DBM data structure in repository (108). When updated device battery status data is received for a wireless charging device, the device state analyzer module (412) updates the corresponding DBM record.

The user profiling module (410) generates a user profile pattern based on user profile data for each wireless charging device of the plurality of wireless charging devices. The user profiling module (410) may generate a usage history for each wireless charging device, and predict a device usage pattern based at least on device usage history for each wireless charging device.

The priority evaluation module (416) assigns priority management rules for charging the plurality of wireless charging devices corresponding to the user based on the device battery status data and user profile data. The priority evaluation module (416) defines charging priority management rules based on at least a predicted power usage of each device of the plurality of devices and a remaining power capacity of each device of the plurality of devices.

The DBM update module (418) transmits assigned priorities for cross-charging to each wireless charging device of the plurality of wireless charging devices based on the applied priority management rules. The DBM update module (418) may initiate wireless charging between a first wireless charging device and a second wireless charging device of the plurality of wireless charging devices based on the priority management rules. The DBM update module transmits the priority factor DBMs (432) to the set of wireless charging devices, which is explained in more detail below.

The user feedback module (420) receives an instruction from a user that modifies a priority management rule, updates corresponding priority management rules for each of the wireless charging devices, and initiates wireless charging among the plurality of devices based on the updated priority management rule.

The power efficiency calculator (414) calculates a wireless charging power transfer loss for each wireless charging device in a set of wireless charging devices. Additionally, the power efficiency calculator (414) receives and transmits data over a communications network.

The repository (108) stores current and past DBM records (404) for each wireless charging device. The repository (108) further stores user profile data that is provided to the PMR system (401) from the wireless charging devices and/or the user, as well as historic user profile patterns.

Figure 5:
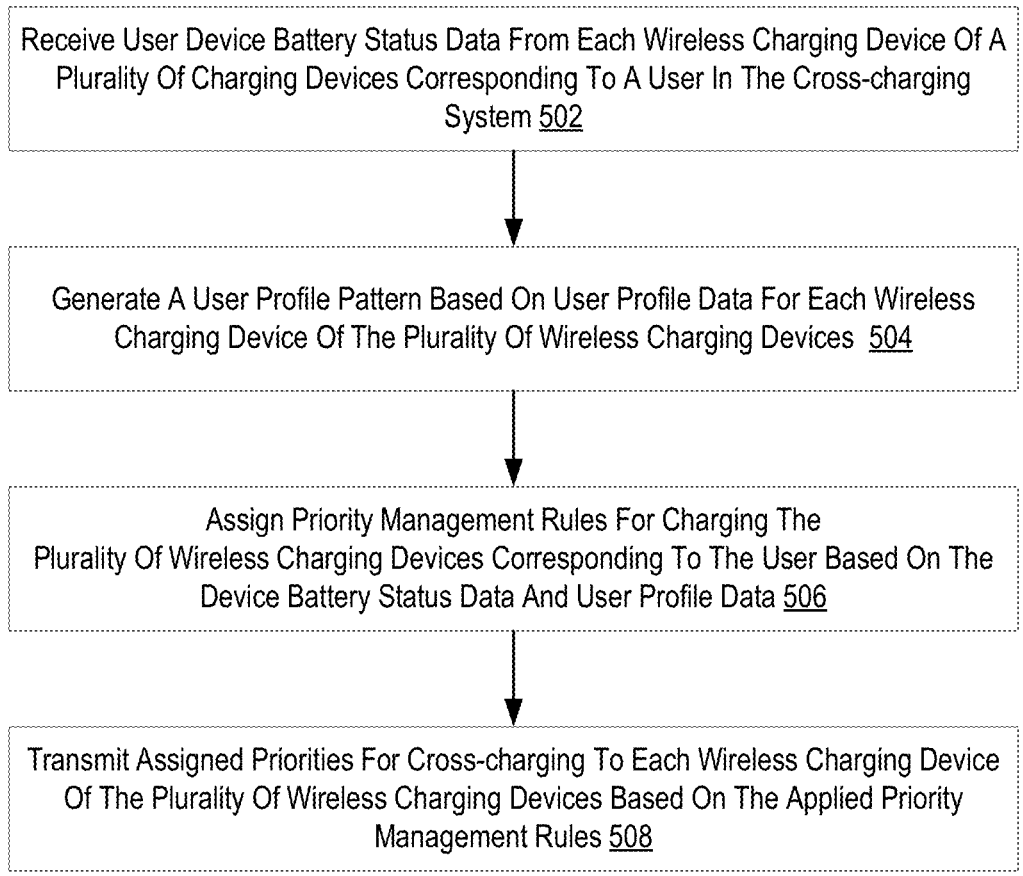

For further explanation, FIG. 5 sets forth a flow chart illustrating an example method for cross-charging among IoT devices with prioritizing management rules in accordance with the present invention that includes receiving (502) user device battery status data from each wireless charging device of a plurality of charging devices corresponding to a user in the cross-charging system, generating (504) a user profile pattern based on user profile data for each wireless charging device of the plurality of wireless charging devices, assigning (506) priority management rules for charging the plurality of wireless charging devices corresponding to the user based on the device battery status data and user profile data, and transmitting (508) assigned priorities for cross-charging to each wireless charging device of the plurality of wireless charging devices based on the applied priority management rules.

In the example method depicted in FIG. 5, user device battery status data is received (502) from each wireless charging device of a set of charging devices corresponding to a user in the cross-charging system. The device battery status data may include battery features, such as those described below with reference to FIG. 6, as well as ancillary variables that affect performance, for example: weather, temperature, battery wear-out level, and battery recharge rate. Individual wireless charging device usage and battery status may be collected for a given cycle period, for example, collected per 24-hr cycle. The set of wireless charging devices corresponding to a user may be IoT devices include including mobile phones, smart watches, laptops, tablets, fitness trackers, and headphones. In the following description, two wireless charging devices (302, 304) belonging to a given user are referenced for example and not limitation. The device battery data may include the battery status, remaining charge, minutes left based on the charge, the current charge power source, a device priority, and a device identifier. Device battery status data may further include a battery deficit threshold, charging progress, charge source device power, charge source device usage, destination device power, and destination device usage. Thus, the battery status and overall power capacity among the set of wireless charging devices may be monitored dynamically.

In the example method depicted in FIG. 5, a user profile pattern is generated (504) based on user profile data for each wireless charging device of the plurality of wireless charging devices. The user profile data may be a historical and predicted usage pattern for each wireless charging device throughout the day. The user profile data may be received from each wireless charging device, retrieved from a repository, retrieved from a user's calendar or given schedule, or provided directly from the user by user data entry. For example, collected profile data may indicate that a user has a historical pattern of using a specific device, such as a laptop, every day during a certain time period, and uses a phone intensely at another time period, and uses a smart watch 24 hours a day. Further, a device calendar may indicate that the user intends to use that device for a particular period of time, such as a scheduled phone call. Based on the user's profile data of using specific devices at specific time periods for each day, and scheduled device usage, a user profile pattern can be generated.

In the example method depicted in FIG. 5, priority management rules (PMR) for charging the plurality of wireless charging devices corresponding to the user are assigned (506) based on the device battery status data and user profile data. PMR may designate a priority level for charging. PMR may designate when a device should be a source charging device or a destination charging device based on current battery status data, user profile data, and predicted usage. PMR assignment balances the cross-charging of the wireless charging devices such that usage interruption is avoided given battery charge threshold limits, predicted usage, and other device and user profile data.

In the example method depicted in FIG. 5, assigned PMR for cross-charging are transmitted (508) to each wireless charging device of the plurality of wireless charging devices based on the applied priority management rules. The assigned PMR are transmitted to the wireless charging devices for the wireless charging devices to update their local battery metrics and apply power management according to the PMR. Data reception and transmission may occur through a cloud implemented via WAN (101).

Figure 6:
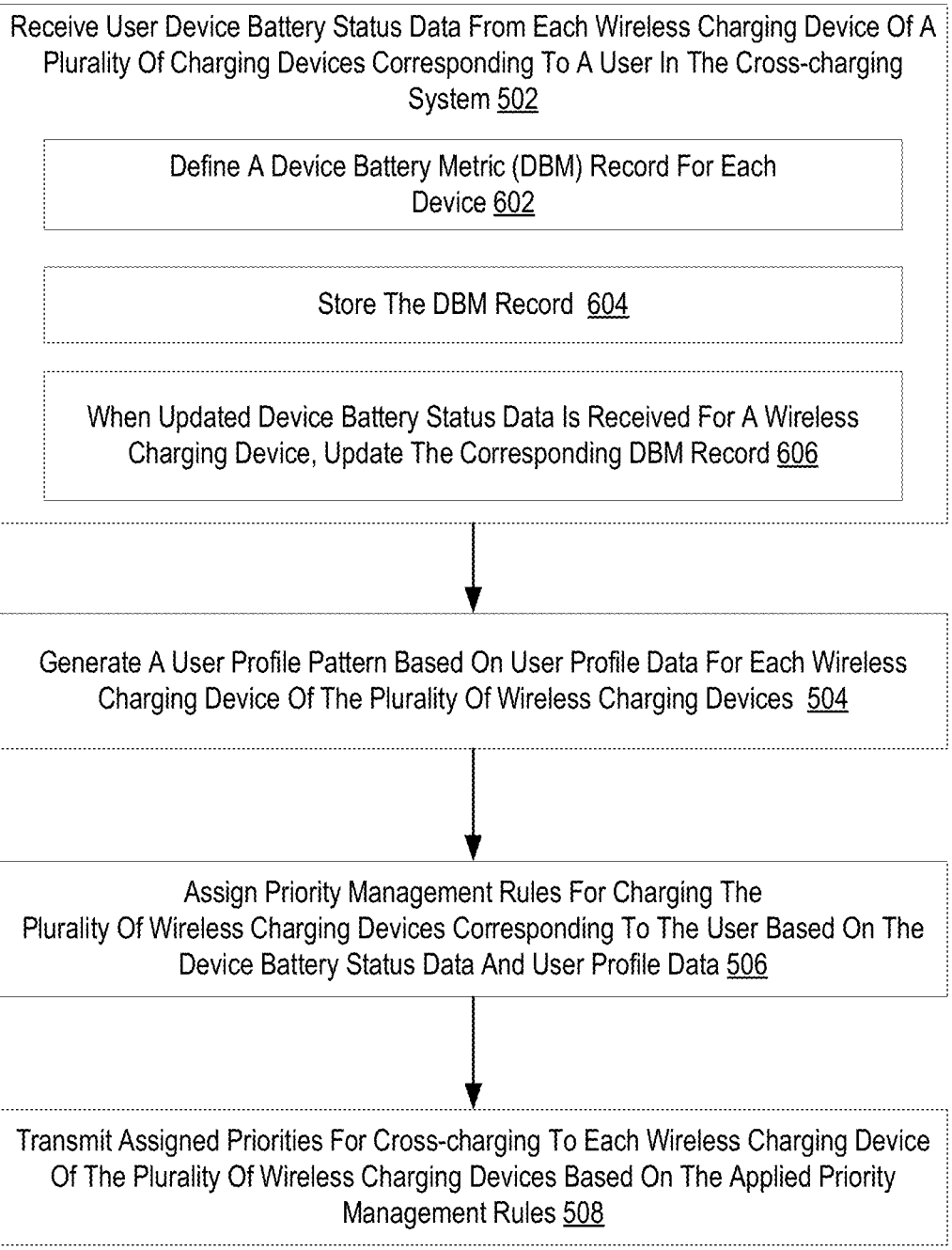
FIG. 6 sets forth a flow chart illustrating an example method for cross-charging among IoT devices with prioritizing management rules according to embodiments of the present invention.

For further explanation, FIG. 6 sets forth a flow chart illustrating a further example method for cross-charging among IoT devices with prioritizing management rules according to embodiments of the present invention. The example method depicted in FIG. 6 is similar to the example method depicted in FIG. 5, as the example method depicted in FIG. 6 also includes receiving (502) user device battery status data from each wireless charging device of a plurality of charging devices corresponding to a user in the cross-charging system, generating (504) a user profile pattern based on user profile data for each wireless charging device of the plurality of wireless charging devices, assigning (506) priority management rules for charging the plurality of wireless charging devices corresponding to the user based on the device battery status data and user profile data, and transmitting (508) assigned priorities for cross-charging to each wireless charging device of the plurality of wireless charging devices based on the applied priority management rules.

In the example method depicted in FIG. 6, receiving (502) user device battery status data from each wireless charging device of a plurality of charging devices corresponding to a user in the cross-charging system can also include defining (602) a device battery metric (DBM) data structure for each device, storing (604) the DBM data structure in an encrypted database, and when updated device battery status data is received for a wireless charging device, updating (606) the corresponding DBM data structure.

In the example method in FIG. 6, a DBM data structure is defined (602) to capture battery metadata for a wireless charging device (302, 304), including device activity status and charging strategy. For example, the DBM data structure, which defines the structure of a DBM record for hold device battery metadata, includes the estimated amount of time left before the current battery capacity is exhausted. The estimated amount of time before the battery capacity is exhausted, that is, the time left until there is zero charge in the battery, is dynamically updated (for example, every 30 s) according to device features, usage activities, and a battery consumption level (for example, higher depletion rate for video chat vs. phone calls). Further, the DBM data structure may include a priority level for charging in the cross-charging system 200, wherein the priority level is represented from low priority ("0"—no charging required) to highest priority ("9"—charging highly required). The priority level may be dynamically updated according to, for example, predicted usage, user activities, user feedback, and specified charging events. Further, the DBM data structure may include the battery charging status, such as whether the battery is actively charging or is idle, or whether the device is actively in use or is idle. Potential charging events of interest may be a threshold of minutes left until zero capacity, a charge capacity threshold, or an active status of the device. The DBM data structure may further include a timestamp indicating the last time the DBM record was updated, and a version number for the DBM record. Still further, the DBM record may indicate the current power source for the wireless charging device (302) and a candidate list of other wireless charging devices (304) from which the wireless charging device (302) may siphon power to charge its battery. An exemplary data structure for a DBM record, represented in C syntax, is illustrated below:

i. Device Battery Metrics (DBM) {
    1. deviceID (String),
    2. minsLeft (mins),
    3. priorityLevel (0-9),
    4. status(*active/*idle), -continued 5. timestamp (YYYY-MM-DD HH:MM:SS),
    6. version (int),
    7. autoChargeOn (true/false),
    8. currentPowerSource (String),
    9. detectedCandidateList[ ]
ii. }

In the example method in FIG. 6, a DBM record for each wireless charging device corresponding to the user is stored (604) in a database, such as an encrypted repository (108). Time-stamped copies of the DBM record for a wireless device may constitute DBM records that may show a pattern of usage for the wireless charging device. Encryption may be used for the DBM repository to preserve sensitive information about the user.

In the example method in FIG. 6, when additional device battery status data is received for a wireless charging device, the corresponding DBM record is updated (606) and a copy is saved to the repository (108). Thus, device battery status data is updated dynamically for each DBM record. Each wireless charging device is associated with one DBM, for example, in a 24 hour cycle.

Figure 7:
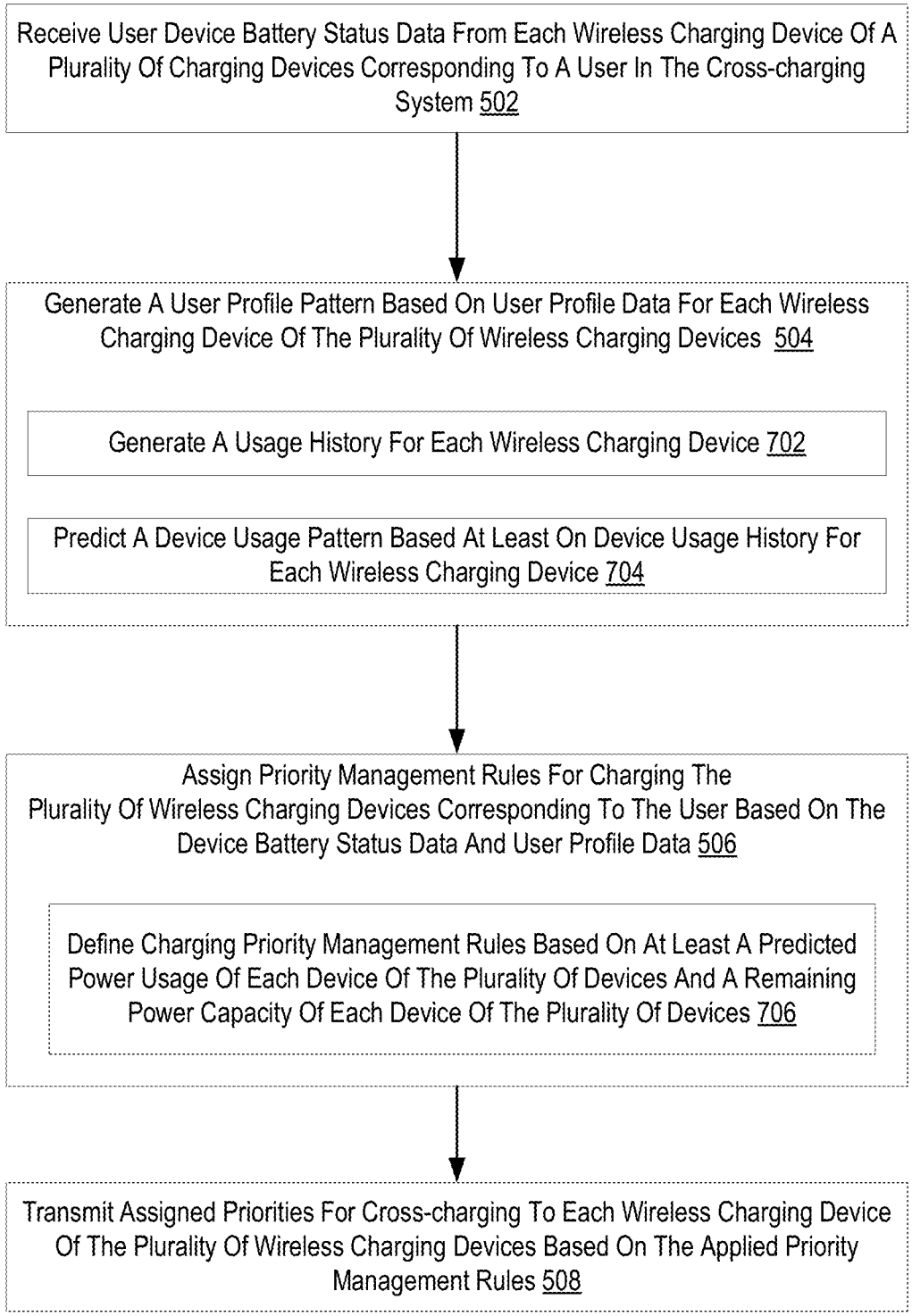
FIG. 7 sets forth a flow chart illustrating an example method for cross-charging among IoT devices with prioritizing management rules according to embodiments of the present invention.

For further explanation, FIG. 7 sets forth a flow chart illustrating a further example method for cross-charging among IoT devices with prioritizing management rules according to embodiments of the present invention. The example method depicted in FIG. 7 is similar to the example method depicted in FIG. 5, as the example method depicted in FIG. 7 also includes receiving (502) user device battery status data from each wireless charging device of a plurality of charging devices corresponding to a user in the cross-charging system, generating (504) a user profile pattern based on user profile data for each wireless charging device of the plurality of wireless charging devices, assigning (506) priority management rules for charging the plurality of wireless charging devices corresponding to the user based on the device battery status data and user profile data, and transmitting (508) assigned priorities for cross-charging to each wireless charging device of the plurality of wireless charging devices based on the applied priority management rules.

In the example method depicted in FIG. 7, generating (504) a user profile pattern based on user profile data for each wireless charging device of the plurality of wireless charging devices can also include generating (702) a usage history for each wireless charging device, and predicting (704) a device usage pattern based at least on device usage history for each wireless charging device. A device usage pattern may be generated (702) based on historical data reflected in DBM records for the device, which indicate, for example, battery status, battery capacity, device usage, and device priority levels, measured and collected in previous daily cycles. Based on the device usage pattern generated (702) determined from past device metrics, a device usage pattern may be predicted (704) for the current daily cycle. Further, other user profile data, such as meeting calendar information or user-defined active and idle periods, may be used to predict (704) battery usage and charging needs for the user's wireless charging devices. By way of example and not limitation, historical device usage and user profile day may indicate intense phone usage between 10 am and 11 am every day, a video conference scheduled from 2 pm to 3 pm conducted on a laptop (provided on a meeting calendar), typical headphone usage between 5 pm and 6 pm, and fitness tracker usage 24/7.

Historical DBM records for the wireless charging devices may be archived in the repository (108) for future reference. These DBM records may provide data to generate usage patterns and user profiles with individual orientation. The import of user profiling to the PMR engine may be done automatically, or manually by the user and stored in the repository (108). Besides capturing instant battery status of each wireless charging device, auto-filled fields in the DBM record may include "priorityLevel" and "powerSourceBatteryLowerLimit", which are determined upon customized user profiling. For example, the user Alex spends most of his time on his phone, and thus a higher priority level is set in the DBM record for Alex's phone. Continuing the example, Alex does not use his tablet as much after 3:30 pm, thus leaving 20% battery on tablet is sufficient, establishing the power source battery lower limit as 20%.

In the example method depicted in FIG. 7, assigning (506) priority management rules for charging the plurality of wireless charging devices corresponding to the user based on the device battery status data and user profile data may further include defining (706) charging priority management rules based on at least a predicted power usage of each device of the plurality of devices and a remaining power capacity of each device of the plurality of devices. For example, a charging priority management rule may be defined (706) in accordance with charging event. A charging event may be a minimum threshold limit on the minutes of remaining power in a wireless charging device, a minimum threshold limit of remaining charge, a predicted usage event, device activity status, or other data indicated by the device battery usage data, usage history, and predicted usage pattern. Priority levels for each wireless charging device (312, 314) in the PMR system (201) may be updated and assigned on the fly in accordance with charging events. The importance and urgency of events is determined by prediction based on the device usage and user profile data. For example, the user may have an important phone call scheduled at 3 pm and lasting for an hour. When an event of interest detected, such as low battery, the detection of the event triggers an auto charging event based on priority rule. The priority management rules implement device prioritizing identification upon device usage, per individual, per cycle time.

Figure 8:
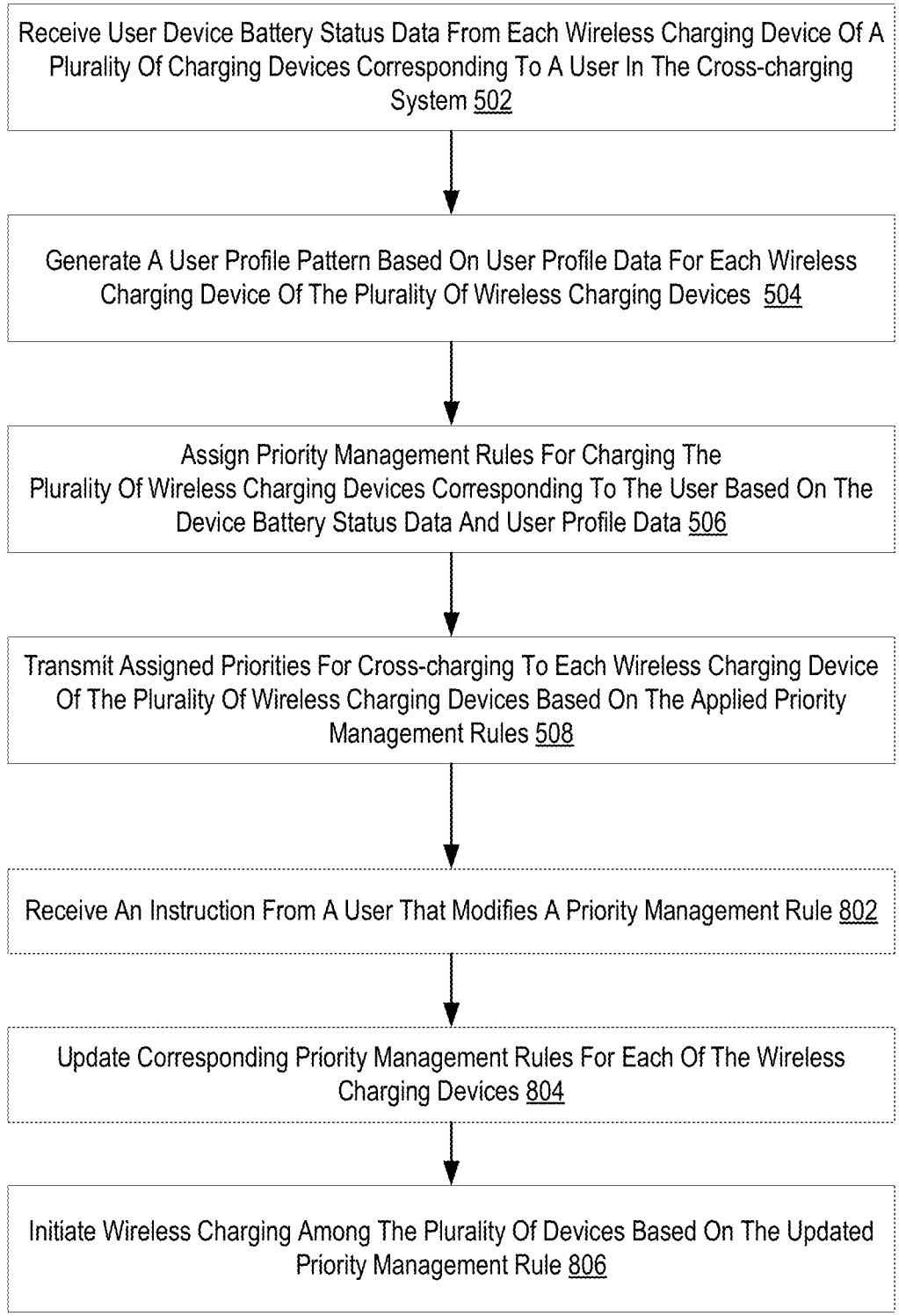
FIG. 8 sets forth a flow chart illustrating an example method for cross-charging among IoT devices with prioritizing management rules according to embodiments of the present invention.

For further explanation, FIG. 8 sets forth a flow chart illustrating a further example method for cross-charging among IoT devices with prioritizing management rules according to embodiments of the present invention. The example method depicted in FIG. 8 is similar to the example method depicted in FIG. 5, as the example method depicted in FIG. 8 also includes receiving (502) user device battery status data from each wireless charging device of a plurality of charging devices corresponding to a user in the cross-charging system, generating (504) a user profile pattern based on user profile data for each wireless charging device of the plurality of wireless charging devices, assigning (506) priority management rules for charging the plurality of wireless charging devices corresponding to the user based on the device battery status data and user profile data, and transmitting (508) assigned priorities for cross-charging to each wireless charging device of the plurality of wireless charging devices based on the applied priority management rules. The example method depicted in FIG. 8 further includes receiving (802) an instruction from a user that modifies a priority management rule, updating (804) a corresponding priority management rules for each of the wireless charging devices affected, and initiating (806) wireless charging among the plurality of devices based on the updated priority management rule.

Figure 10:
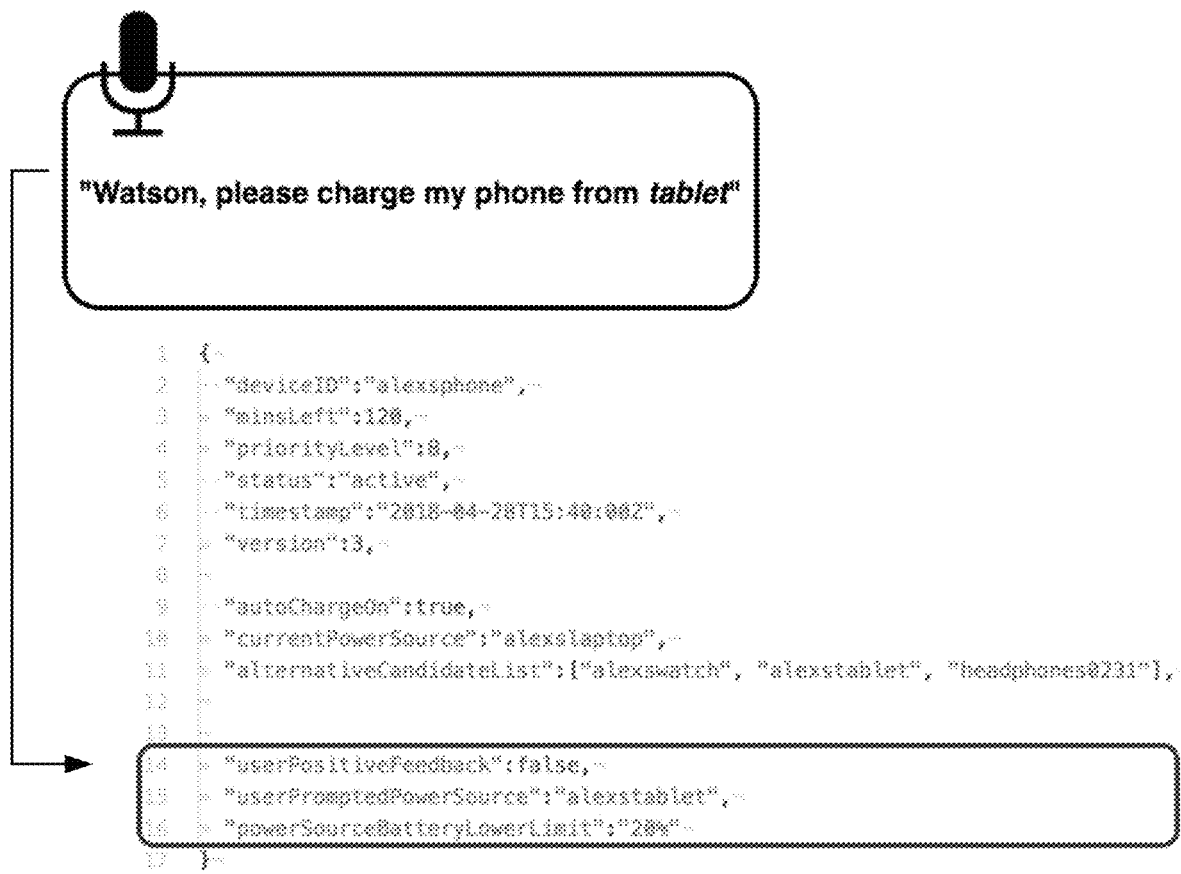
FIG. 10 illustrates an example implementation of the method of FIG. 8 according to embodiments of the present invention.

In the example method depicted in FIG. 8, a previously set PMR is overwritten based on user feedback. The user may be allowed to provide voice or screen selection of opinion via phone with simple yes/no answer or diagnosis sentence. For example, with further reference to FIG. 10, a user may user the microphone of a wireless charging device to provide the following feedback as a voice input: "Hi Watson, please charge my phone from tablet." In this example, upon receiving (802) the user feedback, the PMR engine (408) would update (804) a PMR in the DBM record for "alexsphone" such that a "userPositiveFeedback" is set from "true" to "false", and a "userPromptedPowerSource" that was initially null is set to null before the user provides any feedback is set to "alexstablet", thereby overwriting the "currentPowerSource" that was set to "alexslaptop". A "powerSourceBatteryLowerLimit" is updated (804) in the PMR for "alexsphone" to indicate a minimum battery charge that should remain in source device, here the tablet, after the phone is charged. The minimum charge is automatically determined upon detecting individual usage pattern in a cycle per device. Thus, once the DBM record with updated PMR is sent to the corresponding wireless charging device(s), wireless charging is initiated (806) based on the PMR update.

Figure 9:
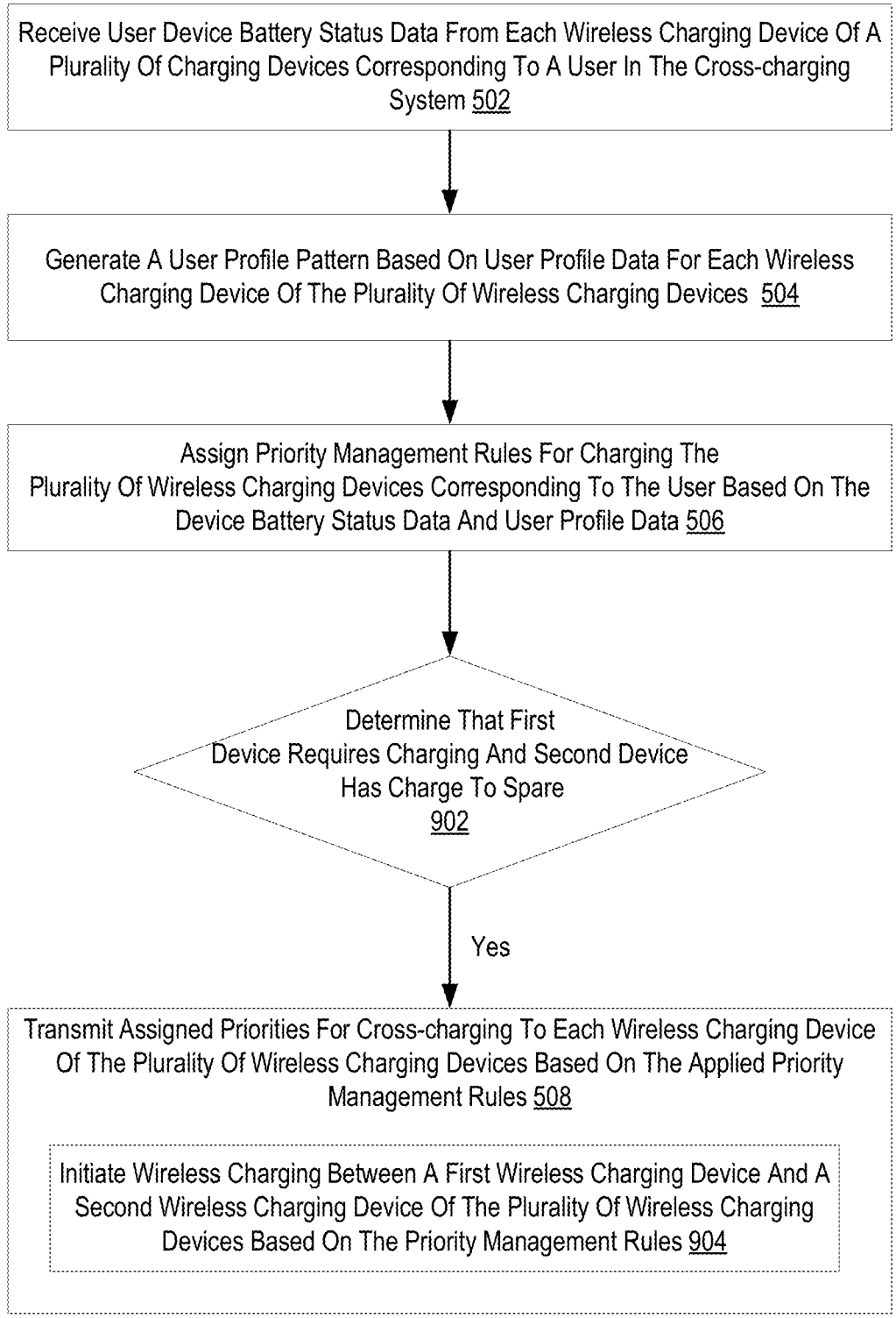
FIG. 9 sets forth a flow chart illustrating an example method for cross-charging among IoT devices with prioritizing management rules according to embodiments of the present invention.

For further explanation, FIG. 9 sets forth a flow chart illustrating a further example method for cross-charging among IoT devices with prioritizing management rules according to embodiments of the present invention. The example method depicted in FIG. 9 is similar to the example method depicted in FIG. 5, as the example method depicted in FIG. 9 also includes receiving (502) user device battery status data from each wireless charging device of a plurality of charging devices corresponding to a user in the cross-charging system, generating (504) a user profile pattern based on user profile data for each wireless charging device of the plurality of wireless charging devices, assigning (506) priority management rules for charging the plurality of wireless charging devices corresponding to the user based on the device battery status data and user profile data, and transmitting (508) assigned priorities for cross-charging to each wireless charging device of the plurality of wireless charging devices based on the applied priority management rules. The example method depicted in FIG. 9 may also include determining (902) that a first device requires charging and a second device has charge to spare. B In the example method depicted in FIG. 9, a charged event is detected where it is determined (902) that a first device requires charging and second device has charge to spare. For example, it may be automatically determined that Alex's phone requires charging, and Alex's tablet has charge to spare.

In example method depicted in FIG. 9, transmitting (508) assigned priorities for cross-charging to each wireless charging device of the plurality of wireless charging devices based on the applied priority management rules can also include initiating (904) wireless charging between a first wireless charging device and a second wireless charging device of the plurality of wireless charging devices based on the priority management rules. Based on the detected charging event and updated PMRs in the DBM record, a priority factored DBM record is provided to the wireless charging device to initiate charging. The charging is initiated (904), for example, by setting the charging source in a priority factored DBM (DBM) provided to a wireless charging device.

Figure 11:
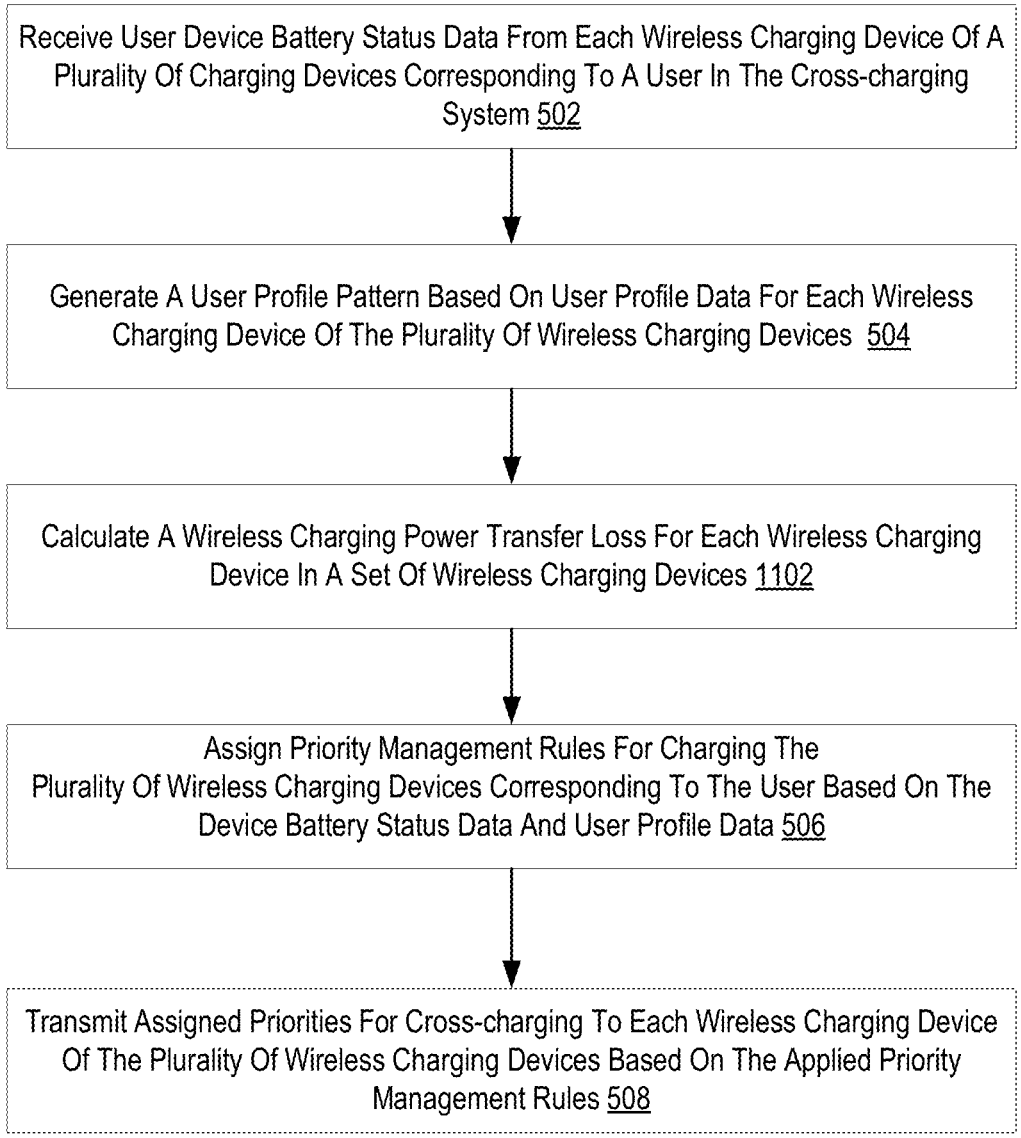
FIG. 11 sets forth a flow chart illustrating an example method for cross-charging among IoT devices with prioritizing management rules according to embodiments of the present invention.

For further explanation, FIG. 11 sets forth a flow chart illustrating a further example method for cross-charging among IoT devices with prioritizing management rules according to embodiments of the present invention. The example method depicted in FIG. 11 is similar to the example method depicted in FIG. 5, as the example method depicted in FIG. 11 also includes receiving (502) user device battery status data from each wireless charging device of a plurality of charging devices corresponding to a user in the cross-charging system, generating (504) a user profile pattern based on user profile data for each wireless charging device of the plurality of wireless charging devices, assigning (506) priority management rules for charging the plurality of wireless charging devices corresponding to the user based on the device battery status data and user profile data, and transmitting (508) assigned priorities for cross-charging to each wireless charging device of the plurality of wireless charging devices based on the applied priority management rules. The example method depicted in FIG. 11 further includes calculating (1102) a wireless charging power transfer loss for each wireless charging device in a set of wireless charging devices. Based on a distance between two given wireless charging devices (302, 304), and angle between the same two wireless charging devices (302, 304), a wireless charging power transfer loss may be calculated for those wireless charging devices (302, 304). The wireless charging power transfer loss may also be based on given battery parameters of the same two wireless charging devices (302, 304).

In view of the explanations set forth above, readers will recognize that the benefits of cross-charging among IoT devices with prioritizing management rules according to embodiments of the present invention include:

IoT communication facilitates the collection of device battery metadata, which may be stored in a device battery metrics data structure, and which his used to make predictions on usage per device for a specific user's set of wireless charging devices;

User profiling for a specific user's set of wireless charging devices throughout the day is used to predict device usage and requirements for the set of wireless charging devices;

Wireless charging priority management rules are defined for the set of wireless charging devices based on the DBM records and user profile to manage wireless charging among the user's set of wireless charging devices, per device, per day;

User feedback may be used to adjust or overwrite priority management rules to allow the user to proactively set charging priorities and limits among the set of wireless charging devices; and Wireless charging power transfer loss further refines predicted charging requirements for and predicted charging times among wireless charging devices, and further informs the priority management rules that should be assigned.

Exemplary embodiments of the present invention are described largely in the context of a fully functional computer system for cross-charging among IoT devices with prioritizing management rules. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Cross-charging among IoT devices with prioritizing management rules illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the cross-charging among IoT devices with prioritizing management rules. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of cross-charging among Internet of Things ('IoT') devices with prioritizing management rules, the IoT devices including a set of wireless charging devices corresponding to a user, the method comprising:
   receiving device battery status data from each wireless charging device in the set of wireless charging devices;
   generating a device usage pattern based on user profile data for each wireless charging device in the set of wireless charging devices;
   assigning at least one priority management rule (PMR) to at least one wireless charging device in the set of wireless charging devices based on the device battery status data and user profile data from each wireless charging device in the set of wireless charging devices; and
   transmitting at least one cross-charging instruction from a PMR engine external to the set of wireless charging devices to at least one wireless charging device in the set of wireless charging devices based on the at least one PMR.

2. The method of claim 1, wherein receiving device battery status data from each wireless charging device in the set of charging devices comprises:
   creating a device battery metric (DBM) data structure for each wireless charging device in the set of wireless charging devices based on the device battery status data, and
   storing the DBM data structure in an encrypted database.

3. The method of claim 1, wherein generating a device usage pattern based on user profile data for each wireless charging device in the set of wireless charging devices further comprises:
   generating a usage history for each wireless charging device in the set of wireless charging devices, and
   predicting the device usage pattern based at least on device usage history for each wireless charging device in the set of wireless charging devices.

4. The method of claim 1, wherein assigning at least one priority management rule (PMR) to at least one wireless charging device in the set of wireless charging devices based on the device battery status data and user profile data from each wireless charging device in the set of wireless charging devices further comprises defining charging priority management rules based on at least a predicted power usage of each device of the set of wireless charging devices and a remaining power capacity of each device of the set of wireless charging devices.

5. The method of claim 1, wherein transmitting at least one cross-charging instruction to at least one wireless charging device in the set of wireless charging devices to each wireless charging device of the plurality of wireless charging devices based on the at least one PMR further includes initiating wireless charging between a first wireless charging device and a second wireless charging device of the set of wireless charging devices based on the at least one PMR.

6. The method of claim 1, further comprising:
receiving an instruction from a user that modifies the at least one PMR in a first wireless charging device in the set of wireless charging devices, and
updating at least one PMR corresponding to a second wireless charging device in the set of wireless charging devices in accordance with the received user instruction.

7. The method of claim 1, further comprising calculating a wireless charging power transfer loss between at least two wireless charging devices in the set of wireless charging devices.

8. An apparatus for cross-charging among Internet of Things ('IoT') devices with prioritizing management rules, the IoT devices including a set of wireless charging devices corresponding to a user, the apparatus comprising a computer processor, a computer memory operatively coupled to the computer processor, the computer memory having disposed within it computer program instructions that, when executed by the computer processor, cause the apparatus to carry out the steps of:
receiving device battery status data from each wireless charging device in the set of wireless charging devices;
generating a device usage pattern based on user profile data for each wireless charging device in the set of wireless charging devices;
assigning at least one priority management rule (PMR) to at least one wireless charging device in the set of wireless charging devices based on the device battery status data and user profile data from each wireless charging device in the set of wireless charging devices; and
transmitting at least one cross-charging instruction from a PMR engine external to the set of wireless charging devices to at least one wireless charging device in the set of wireless charging devices based on the at least one PMR.

9. The apparatus of claim 8, wherein receiving device battery status data from each wireless charging device in the set of charging devices comprises:
creating a device battery metric (DBM) data structure for each wireless charging device in the set of wireless charging devices based on the device battery status data, and
storing the DBM data structure in an encrypted database.

10. The apparatus of claim 8, wherein generating a device usage pattern based on user profile data for each wireless charging device in the set of wireless charging devices further comprises:
generating a usage history for each wireless charging device in the set of wireless charging devices, and
predicting the device usage pattern based at least on device usage history for each wireless charging device in the set of wireless charging devices.

11. The apparatus of claim 8, wherein assigning at least one priority management rule (PMR) to at least one wireless charging device in the set of wireless charging devices based on the device battery status data and user profile data from each wireless charging device in the set of wireless charging devices further comprises defining charging priority management rules based on at least a predicted power usage of each device of the set of wireless charging devices and a remaining power capacity of each device of the set of wireless charging devices.

12. The apparatus of claim 8, wherein transmitting at least one cross-charging instruction to at least one wireless charging device in the set of wireless charging devices based on the at least one PMR further includes initiating wireless charging between a first wireless charging device and a second wireless charging device of the set of wireless charging devices based on the at least one PMR.

13. The apparatus of claim 8, further comprising:
receiving an instruction from a user that modifies the at least one PMR in a first wireless charging device in the set of wireless charging devices, and
updating at least one PMR corresponding to a second wireless charging device in the set of wireless charging devices in accordance with the received user instruction.

14. The apparatus of claim 8, further comprising calculating a wireless charging power transfer loss between at least two wireless charging devices in the set of wireless charging devices.

15. A computer program product for cross-charging among Internet of Things ('IoT') devices with prioritizing management rules, the IoT devices including a set of wireless charging devices corresponding to a user, the computer program product disposed upon a non-transitory computer readable medium, the computer program product comprising computer program instructions that, when executed, cause a computer to carry out the steps of:
receiving device battery status data from each wireless charging device in the set of wireless charging devices;
generating a device usage pattern based on user profile data for each wireless charging device in the set of wireless charging devices;
assigning at least one priority management rule (PMR) to at least one wireless charging device in the set of wireless charging devices based on the device battery status data and user profile data from each wireless charging device in the set of wireless charging devices; and
transmitting at least one cross-charging instruction from a PMR engine external to the set of wireless charging devices to at least one wireless charging device in the set of wireless charging devices based on the at least one PMR.

16. The computer program product of claim 15, wherein receiving device battery status data from each wireless charging device in the set of charging devices comprises:
creating a device battery metric (DBM) data structure for each wireless charging device in the set of wireless charging devices based on the device battery status data, and
storing the DBM data structure in an encrypted database.

17. The computer program product of claim 15, wherein generating a device usage pattern based on user profile data for each wireless charging device in the set of wireless charging devices further comprises:
generating a usage history for each wireless charging device in the set of wireless charging devices, and
predicting the device usage pattern based at least on device usage history for each wireless charging device in the set of wireless charging devices.

18. The computer program product of claim 15, wherein assigning at least one priority management rule (PMR) to at least one wireless charging device in the set of wireless charging devices based on the device battery status data and user profile data from each wireless charging device in the set of wireless charging devices further comprises defining charging priority management rules based on at least a predicted power usage of each device of the set of wireless charging devices and a remaining power capacity of each device of the set of wireless charging devices.

19. The computer program product of claim 15, further comprising:
   receiving an instruction from a user that modifies the at least one PMR in a first wireless charging device in the set of wireless charging devices, and
   updating at least one PMR corresponding to a second wireless charging device in the set of wireless charging devices in accordance with the received user instruction.

20. The computer program product of claim 15, further comprising calculating a wireless charging power transfer loss between at least two wireless charging devices in the set of wireless charging devices.

\* \* \* \* \*